(12) United States Patent
Blair et al.

(10) Patent No.: US 7,930,762 B1
(45) Date of Patent: Apr. 19, 2011

(54) SYSTEMS AND METHODS FOR AUTOMATED MEDIA FILTERING

(75) Inventors: Colin Blair, Westleigh (AU); Andrew W. Lang, Epping (AU); David Thambiratnam, Ashfield (AU); Alexander Beck, Frenchs Forest (AU); Paul McNamara, Sydney (AU); Karen L. Barrett, Chatswood (AU); David Shaw, Croydon Park (AU); Verna L. Iles, North Parramatta (AU); Zao Te Mo, Sydney (AU)

(73) Assignee: Avaya Inc., Basking Ridge, NJ (US)

( * ) Notice: Subject to any disclaimer, the term of this patent is extended or adjusted under 35 U.S.C. 154(b) by 1093 days.

(21) Appl. No.: 11/530,838

(22) Filed: Sep. 11, 2006

(51) Int. Cl.
*G06F 7/04* (2006.01)
*H04N 7/16* (2006.01)

(52) U.S. Cl. .......................................... 726/28; 725/135

(58) Field of Classification Search .................. None
See application file for complete search history.

(56) References Cited

U.S. PATENT DOCUMENTS

| | | | | |
|---|---|---|---|---|
| 2003/0142847 A1* | 7/2003 | Rhoads | ........................ | 382/100 |
| 2005/0132420 A1* | 6/2005 | Howard et al. | ................ | 725/135 |

OTHER PUBLICATIONS

Author Unknown, "Automatic Technology for Real-Time Personalized Television", www.content-wire.com, Feb. 2, 2005, pp. 1-2.
Kidd, Cory D., "The Aware Home: A Living Laboratory for Ubiquitous Computing Research", www-static.cc.gatech.edu/fce/house/cobuild99_final.html, Oct. 1999, pp. 1-5.
Author Unknown,"Boss Key—The Panic Button Feature", www.historykill.info/boss-key.htm, Printed Sep. 10, 2006, pp. 1-2.
Essa, Irfan, "Building an Aware Home: Understanding the Symbiosis Between Computing and Everyday Activities",www.cc.gatech.edu/fce, Jul. 1999, pp. 1-58.
Author Unknown, "Enhancing the Quality of Life with Context-Aware Computing, Personalized Information Processing and Secure Broadband Communications", 1999, pp. 1-6.
Moran Brian, "High-tech home is habitat for 'lifestyle computing'", Atlanta Buisness Chronicle, Oct. 15, 1999, pp. 1-2.
Michael J. Covington et al., "Generalized Role-Based Access Control for Securing Future Applications", College of Computing, Georgia Institute of Technology, Feb. 1, 2000, pp. 1-10.
Author Unknown, "Georgia Tech's Aware Home Research Initiative", www-static.cc.gatech.edu/fce/house/house.html, Printed Sep. 10, 2006, pp. 1-3.
Orr, Robert J., "The Smart Floor: A Mechanism for Natural User Identification and Tracking",College of Computing, Georgia Institute of Technology, Apr. 2000, pp. 1-2.
Essa, Irfan, "Ubiquitous Sensing for Smart and Aware Environments:Technologies towards the building of an Aware Home", Georgia Institute of Technology, Jul. 1999, pp. 1-4.

* cited by examiner

*Primary Examiner* — Brandon S Hoffman
(74) *Attorney, Agent, or Firm* — Sheridan Ross P.C.

(57) ABSTRACT

Various systems and methods for automated media filtering are disclosed. For example, some methods include receiving an indication of a situational difference via an automatic sensor, and based at least in part on the situational difference, a program played on a media player is modified. In some cases, the methods further include accessing a filter that compares the change in situational difference with a predefined access control rule set. As just some of many examples, the situational difference may include a change in persons within proximity of the media player and/or a change in programming selection in relation to the media player.

22 Claims, 5 Drawing Sheets

SYSTEMS AND METHODS FOR AUTOMATED MEDIA FILTERING

BACKGROUND OF THE INVENTION

The present invention is related to media distribution. More particularly, the present invention is related to systems and methods for controlling media distribution based upon persons within proximity of the distribution point.

There has been a growing concern over media content that minors are being exposed to through outlets such as television and the Internet. In some cases, there is a competing desire for adults to have access to such content. In part because of this the adult oriented content is often available to minors. Various efforts have been employed to limit the content that a minor accesses while maintaining an ability for an adult to access such content. For example, the VCHIP was developed which allows for authentication of a user, and thereupon to allow access to authorized content. This has limited a minor's ability to access the content, but has not done anything to cope with the situation where a minor enters the room where an adult is viewing adult content. In such cases, the authorized viewer has often found themselves hopelessly scrambling to change the channel or otherwise modify the media content.

Further, in many cases it is desirable to maintain a level of privacy when viewing media content accessible via the Internet. For example, an employee accessing a particular webpage may not want their manager or other employees to know of the content that they are accessing. One solution to this problem has been to implement a hot key whereby the employee can quickly press a select entry via a keyboard causing an Internet browser application to be swapped out with a more acceptable business application. Such an approach has offered some relief, but it has been less than fully effective.

Hence, for at least the aforementioned reasons, there exists a need in the art for advanced systems and methods for controlling access to various media content and for maintaining privacy in relation to media access.

BRIEF SUMMARY OF THE INVENTION

The present invention is related to media distribution. More particularly, the present invention is related to systems and methods for controlling media distribution based upon persons within proximity of the distribution point.

Various systems and methods for automated media filtering are disclosed. For example, some methods include receiving an indication of a situational difference via an automatic sensor, and based at least in part on the situational difference, a program played on a media player is modified. In some cases, such methods further include accessing a filter that compares the change in situational difference with a predefined access control rule set. As just some of many examples, the situational difference may include a change in persons within proximity of the media player and/or a change in programming selection in relation to the media player. Such media players may include, but are not limited to, a television, a radio, a personal computer, a notebook computer, a personal digital assistant, an audio CD player, and a DVD player.

In some cases, the automatic sensor includes a video sensor that is operable to perform facial recognition on one or more persons within a field of view of the video sensor. Such facial recognition may be, but is not necessarily limited to determining an age range of persons within the field of view of the video sensor. In other cases, the automatic sensor includes a presence sensor that is operable to determine a change in the number of persons within a field of view of the presence sensor, and in yet other cases the automatic sensor includes a motion sensor that is operable to determine a potential change in the number of persons within a range of access of the motion sensor. In particular cases, the motion sensor is operable to detect motion of a person within a range of access of the motion sensor, or motion of a door leading to proximity to the media player. In some cases, the automatic sensor includes a program selection monitor executing on a processor. In such cases, the situational difference may be a combination of a change of programming on the media player, and a determination of persons within proximity of the media player.

Yet other embodiments of the present invention provide systems for automated media filtering. Such systems include a media player, a sensor and a controller that are communicably coupled to one another. The controller is operable to receive an indication of a situational difference from the sensor, and to modify a program played on the media player based at least in part on the situational difference. Where, for example, the media player is a television, the controller may be implemented as a set top box associated with the television. As another example, where the media player is a computer, the controller may be a software module executing on a processor associated with the computer. In such cases, the automatic sensor may include a program selection monitor executing on the processor. In some cases, the controller includes a filter that compares the change in situational difference with a predefined access control rule set.

Yet other embodiments of the present invention provide computer readable media that include instructions executed to perform one or more of the functions set forth above. For example, one particular embodiment of the present invention includes a computer readable medium with instructions executable by a processor to: receive an indication of a situational difference via an automatic sensor; compare the change in situational difference with a predefined access control rule set; and based at least in part on the comparison, modify a program played on the media player.

This summary provides only a general outline of some embodiments according to the present invention. Many other objects, features, advantages and other embodiments of the present invention will become more fully apparent from the following detailed description, the appended claims and the accompanying figures.

BRIEF DESCRIPTION OF THE DRAWING

A further understanding of the various embodiments of the present invention may be realized by reference to the drawing that includes a number of figures that are each described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
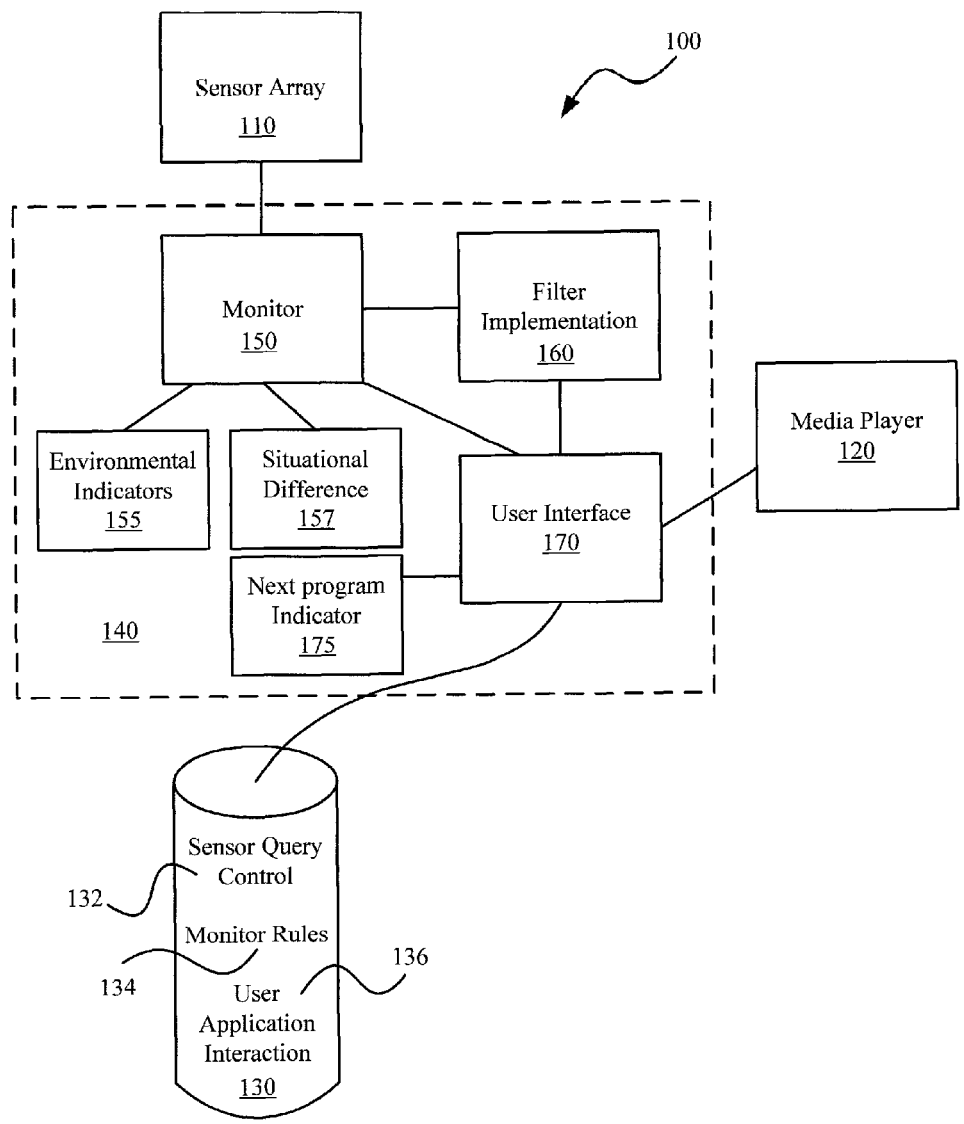
FIG. 1 depicts a general system for automated media filtering in accordance with some embodiments of the present invention.

The present invention is related to media distribution. More particularly, the present invention is related to systems and methods for controlling media distribution based upon persons within proximity of the distribution point.

The present invention may be embodied in various systems and methods for automated media filtering. One particular embodiment of the present invention provides a method that automatically modifies adult content delivered from a media player whenever a minor comes into proximity of the media player. Such embodiments may further include an ability to block access to adult content whenever the presence of a minor is detected. As used herein, the phrase "media player" is used in its broadest sense to mean any device or system capable of playing or displaying audio and/or visual content. Thus, a media player may be, but is not limited to, a television, a radio, a personal computer, a notebook computer, a personal digital assistant, an audio CD player, or a DVD player. Based on the disclosure provided herein, one of ordinary skill in the art will recognize a variety of other media players that may be controlled using one or more embodiments of the present invention.

Detecting the presence of a minor may be accomplished using one of a variety of sensors. As used herein, the term "sensor" is used in its broadest sense to mean any device capable of detecting information about its surroundings and of providing an output reflecting the detected surroundings. Thus, such sensors include, but are not limited to, video sensors, audio sensors, motion sensors, or presence sensors. Based on the disclosure provided herein, one of ordinary skill in the art will recognize a variety of other sensors that may be utilized in relation to one or more embodiments of the present invention. Such sensors may be used to detect situational differences. As used herein, the phrase "situational difference" is used in its broadest sense to mean any change in an environment around a particular media player or any combination of a request for a change in the output of the media player and an existing media player environment. Thus, for example, a situational difference may include, but is not limited to, a change in the number of persons within proximity of the media player, a change in the age groups represented by persons within proximity of the media player, a combination of a request for a change in a program that is operating, playing or being displayed on the media player and the number of persons within proximity of the media player, or a combination of a request for a change in a program that is operating, playing or being displayed on the media player and the age groups represented by the persons within proximity of the media player. For the purposes of this document, powering on a media player may constitute a request for a programming change where the media player is transitioning from no programming to some programming. A request for a program change may include, but is not limited to, opening an application on a personal computer, swapping applications in a personal computer, changing the channel on a television, turning a television on, or changing tracks played on a DVD or CD player. Based on the disclosure provided herein, one of ordinary skill in the art will recognize a variety of other changes that may be monitored and/or utilized in relation to one or more embodiments of the present invention.

In some cases, such methods further include accessing a filter that compares the change in situational difference with a predefined access control rule set. As used herein, the phrase "control rule set" is used in its broadest sense to mean any set of rules governing any operation of a media player based at least in part on a situational change. Thus, for example, where the aforementioned situational change of a minor coming into proximity with the media player occurs, a rule within the control rule set may dictate a change from one television channel to another. As another example, the rule within the control rule set may dictate that the television be switched off. Based on the disclosure provided herein, one of ordinary skill in the art will recognize a number of rules that may be implemented in accordance with embodiments of the present invention. Further, based on the disclosure provided herein, one of ordinary skill in the art will recognize a variety of ways to group such rules within a control rule set and to facilitate access to such rules from a control rule set.

Some embodiments of the present invention are implemented as a computer readable medium including instructions executable by a processor. As used herein, the phrase "computer readable medium" is used in its broadest sense to mean any medium accessible to a processor. Thus, for example, a computer readable medium can be, but is not limited to, a diskette, a CD-ROM, a hard disk drive, an optical disk, a random access memory, or a memory stick. Based on the disclosure provided herein, one of ordinary skill in the art will recognize a variety of computer readable media that may be used in relation to one or more embodiments of the present invention.

Turning to FIG. 1, a general system 100 for automated media filtering is depicted in accordance with some embodiments of the present invention. System 100 includes a sensor array 110, a media player 120, a computer readable medium 130 and a processor based core 140 including a monitor module 150, a filter implementation module 160 and a user interface module 170. Sensor array 110 includes one or more sensors capable of interacting with the environment of media player 120. For example, sensor array 110 may include one or more proximity sensors, one or more presence detectors, one or more motion detectors, and/or one or more face recognition sensors as are known in the art. Such sensors may be placed strategically around media player 120 such that the environment around media player 120 may be adequately monitored.

Media player 120 is capable of displaying either or both of audio and visual media (i.e., programming). Thus, for example, where media player 120 is a television it would generally be capable of displaying video information and playing an associated audio information set. As another example, where media player 120 is a personal computer, it may include a display that provides visual information (either static or dynamic), and may include speakers capable of distributing audio information. In some cases, media player 120 may receive requests to change programming via user interface module 170. In other cases media player 120 may receive requests to change programming directly without interaction with user interface module 170. In such cases, user interface module 170 provides an ability to monitor such programming change requests. In addition, media player 120 includes the ability to be controlled by processor based core 140. As particular examples, media player 120 is operable to allow processor based core to decline a programming change request and/or to turn off or lock media player 120.

The interaction between media player 120 and processor based core 140 is governed by user interface module 170. User interface module 170 executes in accordance with user application interaction instructions 136 maintained on computer readable medium 130. In particular, user interface module 170 operates to receive user commands for either changing the programming on media player 120 or at least for monitoring any request for changing the programming on media player 120. Thus, for example, where media player 120 is a television, processor based core 140 may be implemented as part of a set top box and user interface module 170 may provide an interface to program the set top box and to select programming that will be provided via media player 120. As another example, where media player 120 is a personal computer, processor based core 140 may be the general purpose processor (including I/O) of the personal computer, and user interface module 170 may include a software module capable of determining whenever a request has been received to change applications that are executing and/or visible via the personal computer. Based on the disclosure provided herein, one of ordinary skill in the art will recognize a variety of implementations of user interface module 170 including hardware implementations, software implementations, and combinations of hardware and software implementations.

When a request to change programming is received, it is flagged and maintained as a next program indicator 175. Next program indicator 175 is maintained until the next time a request for a programming change is received. Where the next request for a programming change is accepted and implemented, next program indicator 175 is not changed. Alternatively, where the next request for a programming change is not accepted, next program indicator 175 reverts to indicate the program currently being displayed/played via media player 120.

In some cases, user interface module 170 is a specialized processor including firmware for performing the aforementioned interface functions. Such a specialized processor may also implement the functionality of one or more other modules included within processor based module 140. In other cases, user interface module 170 (and in some cases other modules in processor based module 140) are implemented by a general purpose processor capable of implementing the aforementioned interface functions. Based on the disclosure provided herein, one of ordinary skill in the art will recognize a variety of hardware and software implementations of user interface module 170.

The sensors in sensor array 110 are communicably coupled to processor based core 140 such that information pertaining to the detected environment around media player 120 may be transferred to processor based core 140. In particular, monitor module 150 implements sensor query control rules 132 that direct monitor module 150 to assemble the aforementioned environmental information from sensor array 110 into a grouping of environmental indicators 155. The process of assembling environmental indicators 155 is governed by a set of sensor query control rules 132 maintained on computer readable medium 130. Sensor query control rules 132 may be a set of either static or dynamic rules governing the access of sensors within sensor array 110, any conversion of information from the sensors, and formatting any information received from the sensors as environmental indicators 155. In some cases, where sensor query control rules 132 are static, processor based core 140 may be provided to an end user packaged with a predefined set of sensors. Alternatively, where sensor query control rules 132 are dynamic, processor based core 140 may be provided to an end user with either a predefined set of sensors and a default set of sensor query control rules 132, or sensor query control rules 132 may be programmed via user interface 170 to match particular sensors selected to perform the tasks assigned to sensor array 110. Based on the disclosure provided herein, one of ordinary skill in the art will appreciate a variety of ways that sensor query control rules 132 may be updated to computer readable medium 130 and used by monitor module 150.

In addition, monitor module 150 monitors any request for a programming change on media player 120. In one particular embodiment of the present invention, this monitoring is accomplished on an interrupt basis with user interface module 170 generating an interrupt to monitor module 150 each time a request for a change in programming is received. Alternatively, in other embodiments of the present invention, a polling approach is implemented whereby user interface module 170 writes any request for a programming change to a buffer that is occasionally queried by monitor module 150. Based on the disclosure provided herein, one of ordinary skill in the art will recognize other methods through which monitor module 150 may be alerted of a request for a programming change.

Based on either a change in environmental indicators 155 as derived from sensor array 110 or a request for a change in programming, monitor module 150 may set a situational difference flag 157. Situational difference flag 157 serves as an interrupt or other indicator provided to filter implementation module 160. Situational difference flag 157 indicates that some level of change has occurred in either the type of programming that will be displayed and/or played via media player 120 (as indicated by user interface module 170) or in the potential viewers/listeners within proximity of media player 120 (as indicated by environmental indicators 155).

In some cases, monitor module 150 is a specialized processor including various I/O and executable firmware for controlling sensor array 110 and receiving information from sensor array 110. Such a specialized processor may also implement the functionality of one or more other modules included within processor based module 140. In other cases, monitor module 150 (and in some cases other modules in processor based module 140) are implemented by a general purpose processor capable of receiving I/O from sensor array 110. Based on the disclosure provided herein, one of ordinary skill in the art will recognize a variety of hardware and software implementations of monitor module 150.

Based on situational difference flag 157, filter implementation module 160 accesses environmental indicators 155 and next program indicator 175. A combination of environmental indicators 155 and next program indicator 175 comprise the "situation" of the media player. As used herein, the term "situation" is used in its broadest sense to mean any combination of environment surrounding a media player and media selected for playing on the media player. The environment may indicate the persons within proximity of the media player, or the relative age of persons within proximity of the media player. Filter implementation module 160 compares the accessed situation against various monitor rules 134 that are user programmable and are maintained on computer readable medium 130. Where the comparison indicates that the situation is acceptable, filter implementation module 160 causes the situation to be implemented. In the case where situational difference flag 157 only indicates a change in environmental indicators 155, implementing the situation does not require any changes. Alternatively, where situational difference flag 157 indicates a request for a change in programming, implementing the situation includes causing the change in programming to occur. This may be implemented, for example, by causing user interface module 170 to send the programming change request to media player 120 that in turn modifies the programming output to match the request.

Alternatively, where the comparison indicates that the situation is not acceptable, filter implementation module 160 precludes implementation of the situation. In the case where situational difference flag 157 only indicates a request for a change in programming, precluding the implementation may be as simple as not implementing the requested programming change. Alternatively or in addition, a message may be displayed or played indicating why the request is not being implemented after which the preceding programming is continued. Alternatively, where situational difference flag 157 indicates a change in the environmental indicators, the current programming may be switched or media player 120 turned off to avoid exposing someone within proximity to media player 120 to the current programming. Based on the disclosure provided herein, one of ordinary skill in the art will recognize a variety of approaches that may be implemented to implement a particular situation or to preclude implementation of a particular situation.

In some cases, filter implementation module 160 is a specialized processor including firmware for performing the aforementioned filter functions. Such a specialized processor may also implement the functionality of one or more other modules included within processor based module 140. In other cases, filter implementation module 160 (and in some cases other modules in processor based module 140) are implemented by a general purpose processor capable of implementing the aforementioned filtering functions. Based on the disclosure provided herein, one of ordinary skill in the art will recognize a variety of hardware and software implementations of filter implementation module 160.

Figure 2:
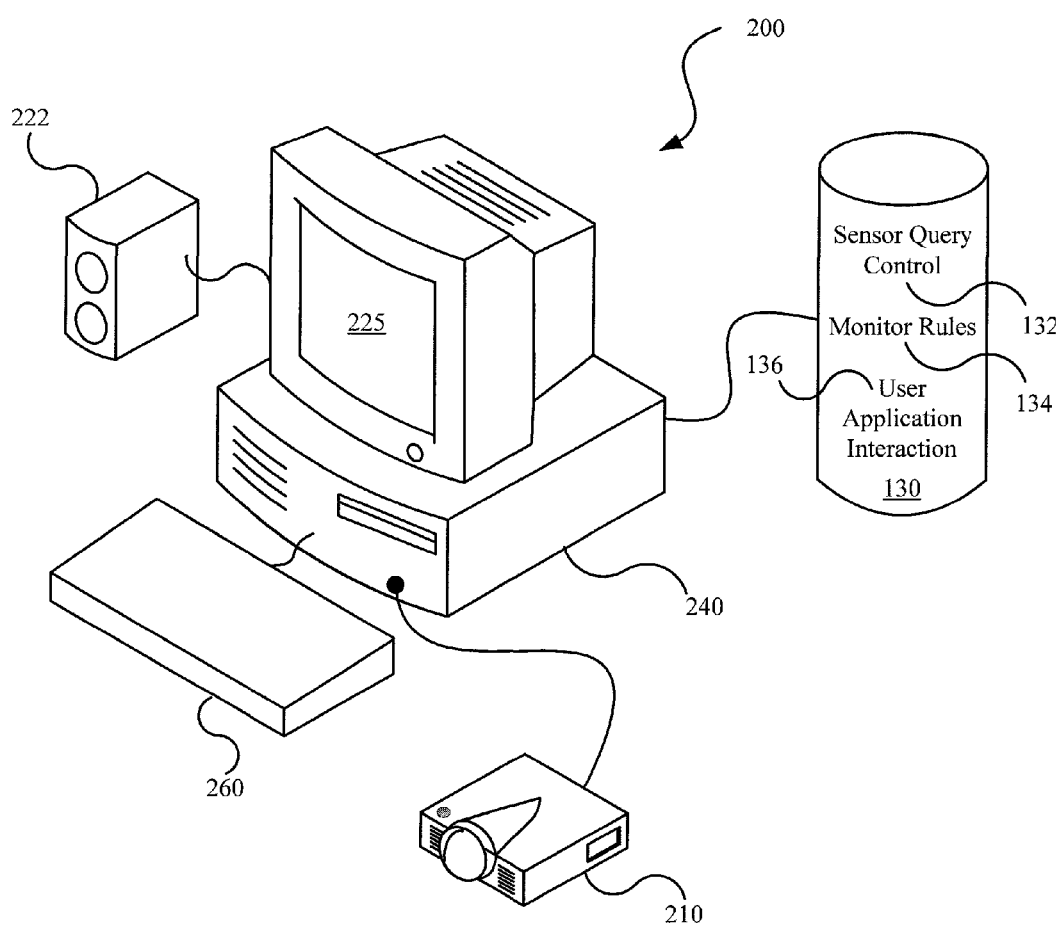
FIG. 2 depicts a computer system for automated media filtering in accordance with one or more embodiments of the present invention.

Turning to FIG. 2, a computer system 200 for automated media filtering in accordance with various embodiments of the present invention is depicted. Computer system 200 includes a personal computer 240 that is programmed to perform the functions of processor based core 140. Computer system 200 further includes a webcam 210 that is connected to personal computer 240 via a wired connection. However, it will be understood by one of ordinary skill in the art that webcam 210 may be wirelessly coupled to personal computer 240. Personal computer 240 is also coupled to a speaker 222 and a visual display 225. The combination of visual display 225 and speaker 222 perform the functions of media player 120.

Figure 3:
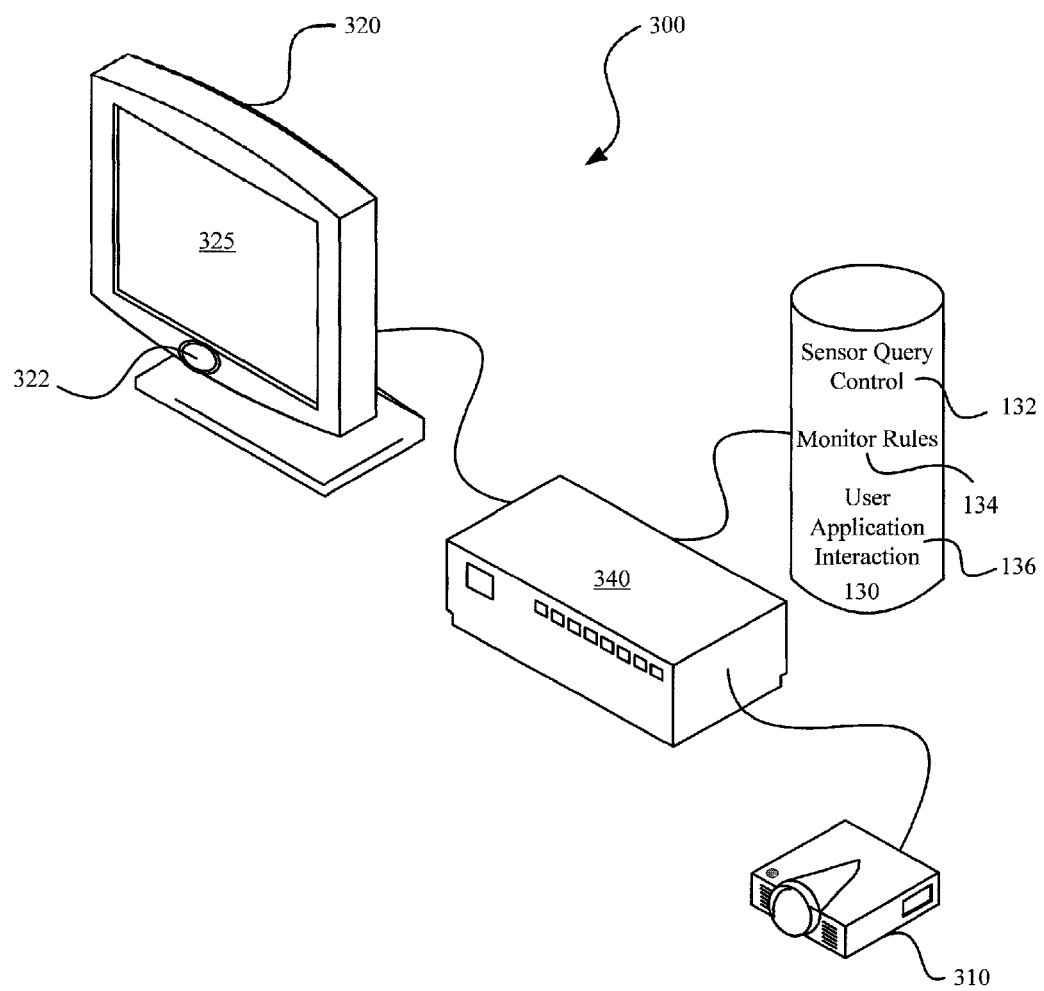
FIG. 3 depicts a television system for automated media filtering in accordance with one or more embodiments of the present invention.

Turning to FIG. 3, a television system 300 for automated media filtering in accordance with some embodiments of the present invention is depicted. Television system 300 includes a set top box 340 that is designed to perform the functions of processor based core 140. Television system 300 further includes a video camera 310 that is connected to coupled to set top box 340. Set top box 340 is also coupled to a speaker 322 and a visual display 325. The combination of visual display 325 and speaker 322 perform the functions of media player 120.

Figure 4:
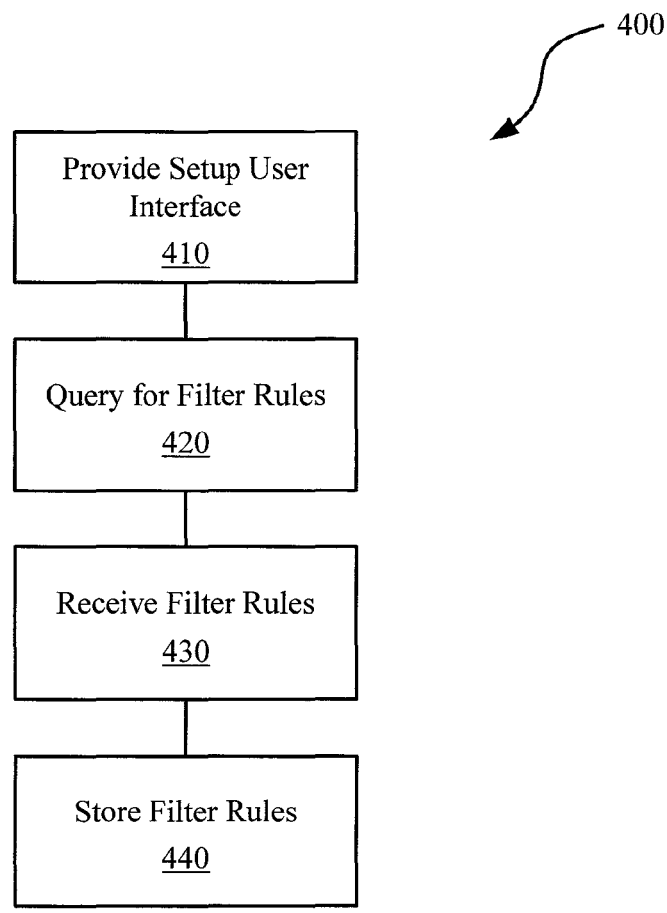
FIG. 4 is a flow diagram illustrating a method for programming a media filtering system in accordance with some embodiments of the present invention.

Turning to FIG. 4, a flow diagram 400 depicts a method for programming a media filtering system in accordance with some embodiments of the present invention. Following flow diagram 400, a user is provided with a setup interface (block 410). This setup interface may be, for example, a menu driven interface that is driven by user interface module 170 and displayed via either an audio or visual portion of media player 120. Via the interface, the user may be presented with a number of options for viewing existing filter rules and for updating the filter rules (block 420). Thus, for example, the user may be presented with a number of existing filter rules identifying unacceptable situations. The user may then be queried as to whether they would like to add another unacceptable situation, modify one or more of the existing unacceptable situations, or to delete one of the unacceptable situations. In response to the query (block 420), a request to add a new filter rule, or modify or delete one of the existing filter rules is received (block 430). The request for modification is received and stored along with the filter rules (block 440). This can include storing the filter rules to computer readable medium 130 where the filter rules can be accessed by filter implementation module 160.

Figure 5:
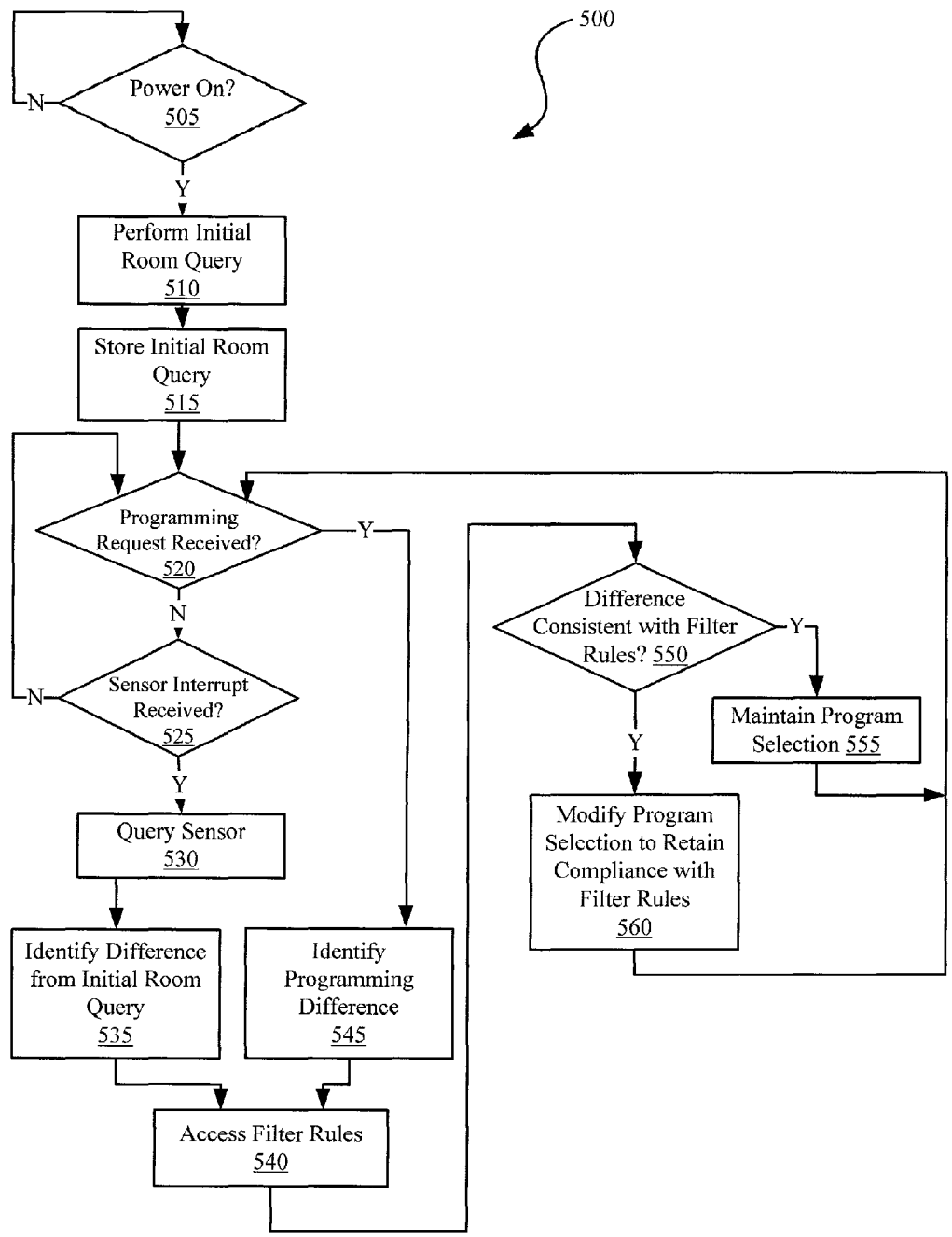
FIG. 5 is a flow diagram depicting a method for automated media filtering in accordance with various embodiments of the present invention.

Turning to FIG. 5, flow diagram 500 depicts a method for automated media filtering in accordance with various embodiments of the present invent. Following flow diagram 500, power is applied to an automated media filtering system such as those discussed in relation to FIGS. 1-3 above (block 505). Upon power up (block 505), an initial room query is performed (block 510). This initial room query includes receiving input from sensor array 110, and from the input, determining the makeup of viewers in proximity to a particular media player. In the case, for example, where face recognition is implemented, the initial room query may include determining the persons who are in the room. Alternatively, in the case where simplified facial recognition is implemented, the number of persons in the room as well as their approximate ages may be determined. As yet another alternative, only the actual number of persons in the room may be determined. This initial room query is stored as environmental indicators 155 (block 515).

It is next determined whether a programming request is received (block 520). Upon initial power up, the programming request may be the programming which was being accessed during a previous operation of the system. In contrast, after power up, a programming request may be a request to change the programming that is being provided via the particular media filtering system. Where no programming request has been received (block 520), it is determined if a sensor interrupt has been received (block 525). In some cases, this sensor interrupt may be set whenever any sensor from sensor array 110 indicates some change in the environment surrounding the particular media player. Thus, for example, if a sensor detects motion in the room or a change in the number of persons in the room a sensor interrupt may be generated.

Where a sensor interrupt is received (block 525), the particular sensor is queried (block 530) and it is determined whether a change has occurred in environmental indicators 155 (block 535). Similarly, where a programming request is received (block 520), the difference in the requested program and the currently displayed program is determined and next program indicator 175 is set (block 545). Where either a programming request is received (block 520) or a sensor interrupt is received (block 525) the filter rules are accessed by filter implementation module 170. In one particular case, a sensor interrupt or a request for a programming change is indicated by the setting of situational difference flag 157.

It is determined if the new situation indicated by situational difference flag 157 is consistent with the accessed filter rules (block 550). If the new situation is consistent with the filter rules (block 550), then the existing programming is maintained where the access to the filter rules was necessitated by a change in environmental indicators 155, or the request for a programming change is honored where the access to the filter rules was necessitated by such a request. Alternatively, where the new situation is not consistent with the filter rules (block 550), programming selection is modified to maintain compliance with the filter rules (block 560). This may include turning all programming off or changing to a program that is acceptable. In either case, a warning message may be displayed in addition to the programming modification.

It should be noted that some embodiments of the present invention may be somewhat less automated. For example, in the personal computer situation various applications running on the personal computer or URLs and files accessed by the personal computer may be classified as "work", "non-work" or "private". Using such classifications, keystrokes can be assigned to each category and when the keystrokes are pressed a person may be switched out of one category of application to the most recently used application in another category. This results in a believable switch as the application that is being used as a replacement is something the user was recently working on. The keystroke trigger may also be replaced by an automated trigger such as a presence detector activated by sensing the bosses RFID tag or a cell phone used by the boss.

At this juncture a few examples may be beneficial to aid in understanding the breadth to which the aforementioned systems and methods may be applied. As stated, these are merely exemplary and should not be considered limiting in any way. As the first example, media player 120 is a television and processor based core 140 is a set top box capable of changing the channels of the television. Sensor array 110 includes only a single camera capable of sensing the facial features of persons within its field of view (i.e., proximity to the television). The facial feature information can be used to perform recognition of the approximate ages of persons within the field of view of the camera. Four people typically watch the television: a father age thirty-nine, a mother age thirty-six, a daughter age fourteen and a son age ten. The facial recognition is capable of recognizing the mother and the father as being of some age greater than twenty-five, and to identify the two children as being of some age less than eighteen. In some cases, the aforementioned facial recognition may be replaced with some other algorithmic or heuristic guess at the ages of persons within a given room. For example, the facial recognition may be replaced with a height indicator that uses a person's height as a rough proxy for their age.

The filter rules are set to utilize television rating information available for distinct groups of persons: (1) all audiences, (2) mature audiences and (3) adult audiences. Further, the user has programmed the filter rules to define a mature person and an adult as anyone twenty years of age or older. Further, the filter rules have been programmed to disallow any access to adult programming. Where any of the filter rules are violated, the programming is automatically changed to a twenty-four hour news program where mature material is never displayed.

In operation, the parents may be watching a program identified for mature audiences. When the television is powered on, the video camera identifies only two adults (i.e., the parents) in the room. As the chosen program being watched by the two adults is consistent with the filter rules, the program is provided via the television. At some point, one of the adults leaves the room to get a sandwich. This causes a change in environmental indicators 155. However, as the filter indicates that it is acceptable for the remaining adult to watch the program, the programming continues to be displayed by the television. At a later point, the daughter walks in the room to ask her parent a question. The video camera detects the presence of the entering teenager and identifies her of an age less than eighteen. As this situation is no longer consistent with the filter rules, the television programming is changed to the aforementioned news network. When the teenager leaves the room, the video camera indicates that only a single adult is in the room, and the television programming may be returned to the earlier watched mature program. At yet a later point, the remaining adult changes the channel of the television to an adult program. As this is inconsistent with the filter rules, the requested channel change is ignored.

As a further hook, the filter rules may be programmed to switch to the news network whenever the room is unoccupied. This avoids the situation where someone tries to access unauthorized programming by either obscuring the camera or somehow hiding from the camera. This further allows an adult to leave the room without concern that their child may enter the room and that the system may not adequately respond to the entry of the child.

As a second example, media player 120 may be a display of a personal computer, and processor based core 140 may be the processor and I/O functionality of the personal computer. Sensor array 110 includes only a webcam connected to the personal computer via a USB port, and is capable of detecting the number of humans of any age within its field of view (i.e., proximity to the display). The filter rules are set to identify a set of Internet websites that may only be viewed when a particular person is logged into the personal computer, and only when a single person is in the room.

In operation, the authorized user may be logged into the personal computer and that person may access one of the identified Internet websites. At the point of logging into the personal computer, the logged in user is the only person in the room. The user requests one of the identified Internet websites (e.g., a payslip or Internet banking site) and because the user is logged in and the only person in the room, the personal computer proceeds to serve the selected website. When someone enters the room, the application is automatically switched so that the entering person is not aware of the website being accessed by the logged in user. As one particular example, the user of the computer may be a manager filling out a confidential employee evaluation. In such a case, it would be beneficial for the evaluation to be swapped out for another application where someone else enters the room. In addition, where the only user in the room leaves the room, the content of the website is made unavailable and cannot be restored until the user logs in anew. This avoids the condition where the logged in user leaves which would allow another unauthorized user to enter and view the identified website.

As a twist on the aforementioned exemplary system, it may be modified to allow use of a particular application to a logged on user, and only when that user is the only person in the room. This could be used, for example, to limit access to sensitive of classified documents. Thus, the logged in user could access the classified documents which they have been authorized to view and at the same time the classified documents could be protected from the view of someone else that enters the room unknown to the logged in user.

As yet another twist on the aforementioned exemplary system, the system may be utilized to avoid the problem of a child walking into the room when the parent is looking for Christmas gifts for the child using the Internet. Whenever someone else enters the room (potentially a child) the Internet could automatically be switched to some other page that is of no interest to the child, or an application other than the Internet browser.

As a third example, media player 120 may be a display of a personal computer, and processor based core 140 may be the processor and I/O functionality of the personal computer. Sensor array 110 includes only presence detector capable of indicating that someone is entering through a particular doorway. The presence detector may be wirelessly connected to the personal computer. The filter rules are set to allow access to the Internet by any logged in user, but to switch from an Internet browser application to another application such as a word processing application whenever the sensor indicates that someone has passed through the aforementioned doorway. This condition remains until reset through reselection of the Internet browser application.

In operation, the user may be logged into the personal computer and surfing the Internet using an Internet browser. At some point, the user's boss enters the room through the doorway which is detected by the sensor. The Internet browser application is automatically minimized and the word processor application is brought up. This aids a user in appearance to his boss. Where the user determines that the person entering the room can be exposed to their Internet browsing habits, the user reselects the browser application which remains active until the next time someone passes through the doorway.

In conclusion, the present invention provides novel systems, devices, methods and arrangements for controlling media distribution based upon persons within proximity of the distribution point. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for automated media filtering, the method comprising:
    a processor executing a filter implementation module, wherein the processor is in communication with a media player and an automatic sensor;
    receiving, by the filter implementation module, an indication of a situational difference via the automatic sensor;
    accessing, by the filter implementation module, a control rule set, wherein the control rule set includes a monitor rule;
    comparing, by the filter implementation module, the situational difference to the monitor rule;
    if the situational difference is inconsistent with the monitor rule, directing, by the filter implementation module, the media player to modify a program played on the media player; and
    if the situational difference is consistent with the monitor rule, the media player playing the program without modification.

2. The method of claim 1, wherein the comparison to the monitor rule determines if the program is inappropriate for a person watching the media player.

3. The method of claim 1, wherein the situational difference is a change in persons within proximity of the media player.

4. The method of claim 3, wherein the automatic sensor includes a video sensor, and wherein the video sensor is operable to perform facial recognition on one or more persons within a field of view of the video sensor.

5. The method of claim 4, wherein the automatic sensor includes a motion sensor, and wherein the motion sensor is operable to determine a potential change in the number of persons within a range of access of the motion sensor.

6. The method of claim 5, wherein motion sensor is operable to detect motion of an object selected from a group consisting of: a person within a range of access of the motion sensor, and a door leading to proximity to the media player.

7. The method of claim 4, wherein the facial recognition is operable to determine an age range of the one or more persons within the field of view of the video sensor.

8. The method of claim 3, wherein the automatic sensor includes a presence sensor, and wherein the presence sensor is operable to determine a change in the number of persons within a field of view of the presence sensor.

9. The method of claim 1, wherein the automatic sensor includes a program selection monitor executing on the processor.

10. The method of claim 9, wherein the situational difference is a combination of a change of programming on the media player, and a determination of persons within proximity of the media player.

11. The method of claim 1, wherein the media player is selected from a group consisting of: a television, a radio, a personal computer, a notebook computer, a personal digital assistant, an audio CD player, and a DVD player.

12. A system for automated media filtering, the system comprising:
    a media player;
    a sensor; and
    a controller communicably coupled to the media player and the sensor, the controller operable to:
        receive an indication of a situational difference from the sensor;
        access a control rule set, wherein the control rule set includes a monitor rule;
        compare the situational difference to the monitor rule;
        if the situational difference is inconsistent with the monitor rule, automatically modify a program played on the media player based at least in part on the situational difference; and
        if the situational difference is consistent with the monitor rule, pretermitting a modification to the program played on the media player.

13. The system of claim 12, wherein the media player is selected from a group consisting of: a television and a computer.

14. The system of claim 13, wherein the media player is a television, and wherein the controller is implemented as a set top box associated with the television.

15. The system of claim 13, wherein the media player is a computer, and wherein the controller is a module executing on a processor associated with the computer.

16. The method of claim 15, wherein the sensor includes a program selection monitor executing on the processor.

17. The system of claim 12, wherein the comparison to the monitor rule determines if the program is inappropriate for a person watching the media player.

18. The method of claim 12, wherein the situational difference is selected from a group consisting of: a change in persons within proximity of the media player, a combination of a change of programming on the media player, and a determination of persons within proximity of the media player.

19. The method of claim 12, wherein the sensor is selected from a group consisting of: a video sensor operable to perform facial recognition on one or more persons within a field of view of the sensor, a presence sensor operable to determine a change in the number of persons within a field of view of the sensor, and a motion sensor operable to determine a potential change in the number of persons within a range of access of the motion sensor.

20. The method of claim 19, wherein the sensor is a video sensor, and wherein the facial recognition is operable to determine an age range of the one or more persons within the field of view of the video sensor.

21. The method of claim 19, wherein the sensor is a motion sensor, and wherein the motion sensor is operable to detect motion of an object selected from a group consisting of: motion of a person within a range of access of the motion sensor, and motion of an entry leading to proximity to the media player.

22. A non-transitory computer readable medium, wherein the computer readable medium comprises:
  instructions executable by a processor to:
    receive an indication of a situational difference via an automatic sensor;
    access a predefined access control rule set, wherein the control rule set includes an access control rule;
    compare a change in situational difference with the predefined access control rule set, wherein the comparison to the predefined access control rule determines if a program is inappropriate for a person watching a media player; and
    based at least in part on the comparison, automatically modify the program played on the media player.

* * * * *